United States Patent
Bolton et al.

(12)

(10) Patent No.: US 6,220,268 B1
(45) Date of Patent: Apr. 24, 2001

(54) MOISTURE CONTROLLED VALVE WHICH DOES NOT PERMIT PARTIAL FLUID FLOW

(76) Inventors: Ross Spencer Bolton, Santa Ana; John Darcy Bolton, Irvine, both of CA (US)

( * ) Notice: Subject to any disclaimer, the term of this patent is extended or adjusted under 35 U.S.C. 154(b) by 0 days.

(21) Appl. No.: 09/556,383

(22) Filed: Apr. 24, 2000

(51) Int. Cl.[7] .................................................. A01G 27/00
(52) U.S. Cl. ........................... 137/14; 137/78.3; 137/556
(58) Field of Search ............................ 137/78.3, 63, 556

(56) References Cited

U.S. PATENT DOCUMENTS

| | | | |
|---|---|---|---|
| 3,747,399 | * 7/1973 | Treirat | 73/73 |
| 3,898,843 | 8/1975 | Waterson | 61/13 |
| 4,055,200 | 10/1977 | Lohoff | 137/624.1 |
| 4,095,458 | 6/1978 | Wild | 73/73 |
| 4,120,813 | 10/1978 | Hatanaka | 252/194 |
| 4,182,357 | 1/1980 | Ornstein | 137/1 |
| 4,256,133 | 3/1981 | Coward | 137/78.3 |
| 4,489,603 | 12/1984 | Fukami | 73/337 |
| 4,648,555 | 3/1987 | Gumbmann, Jr. | 239/63 |
| 4,655,076 | 4/1987 | Weihe | 73/73 |
| 4,696,319 | 9/1987 | Gant | 137/78.3 |
| 4,744,515 | 5/1988 | Watanbe | 239/70 |
| 4,987,915 | 1/1991 | Goldsmith | 137/78.3 |
| 4,989,628 | * 2/1991 | Gil et al. | 137/78.3 |
| 5,100,056 | * 3/1992 | Theodorsen et al. | 239/63 |
| 5,156,179 | * 10/1992 | Peterson et al. | 137/78.3 |
| 5,224,795 | 7/1993 | Lopic et al. | 405/37 |
| 5,329,081 | 7/1994 | Jones | 200/61.04 |
| 5,520,672 | 5/1996 | Urry | 604/368 |
| 5,794,848 | 8/1998 | Nunn | 239/63 |
| 5,848,494 | 12/1998 | Spelt | 47/67 |

* cited by examiner

Primary Examiner—A. Michael Chambers

(57) ABSTRACT

A valve which, when water pressure is applied, either permits or prevents water flow to the sprinkler depending on the ambient moisture level. Thereby watering plants at their optimum water needs to produce better vegetation with less waste of water and money. The device comprises a moisture indicator bar (16) attached to a hygrometer coil (20). When the hygrometer coil senses sufficient moisture, the moisture indicator bar blocks the passage of the piston rod (14), preventing water flow out through the T pipe watering device side (42). If there is insufficient moisture, the hygrometer bar does not block the passage of the piston rod, the piston seal (12) moves past the T pipe watering device side, allowing water to flow out the watering device side to the sprinkler onto the plants. When water pressure is removed, the piston return spring (24) returns the piston rod and seal back to their initial position.

3 Claims, 4 Drawing Sheets

MOISTURE CONTROLLED VALVE WHICH DOES NOT PERMIT PARTIAL FLUID FLOW

CROSS REFERENCE TO RELATED APPLICATIONS

There are none.

STATEMENT REGARDING FEDERALLY SPONSORED RESEARCH

There was no federally sponsored research that contributed to this invention or this application.

REFERENCE TO A MICROFICHE APPENDIX

None submitted.

FIELD OF THE INVENTION

This application relates to water flow valves, specifically irrigation valves controlled by ambient soil moisture.

BACKGROUND OF THE INVENTION

Irrigation devices spread water on the soil. A common irrigation method employed is a sprinkler which sprays water when pressurized water is supplied to the orifice.

Frequently watering is done by sprinklers connected to a main water supply line. Water flow into the main line can be controlled manually or by automatic timers connected to water supply valves.

Both methods waste a great deal of water. Plant needs and soil conditions are extremely variable over a field or yard. Soil variations such as ph, water evaporation, ambient light, ambient temperature, and drainage rate change the amount of external irrigation required to support optimum plant growth. Different plants have a wide range watering preferences. Usually, to be certain that the few plants with the maximum water needs are adequately served, users overwater the remaining plants. Automatic timers water indiscriminately, even when it is raining.

An obvious improvement would be a valve at each sprinkler that senses soil moisture and permits watering as required by the plants at that point, for those specific conditions, regardless if the water is controlled manually or automatically.

The term sprinkler will be used in this patent to refer to all plant watering devices, including, but not limited to, sprayers, misters, drip devices, and flood gates.

The terms sufficiently moist and insufficiently moist refer to moisture preferences of the plants for optimum growth as determined by the user of this device.

There are many substances that expand and contract in proportion to the amount of moisture they encounter. Some of these include hydrogels, flax, cotton, hair, leather, nylon, wood products and their derivatives such as pulp and paper. Weihe U.S. Pat. No. 4,655,076 (1987) lists over 40 materials that are moisture responsive in this way. Hatanaka U.S. Pat. No. 4,120,813 (1978) and Urry U.S. Pat. No. 5,520,672 (1996) describes how to make various others. Some moisture responsive materials can be incorporated to make a coil or thread which conveys the moisture level through movement. The term hygrometer will be used in this patent to refer to all of these substances and devices which expand and contract with changing moisture levels.

DESCRIPTION OF THE RELATED ART

Numerous inventors have attempted to describe a device to regulate watering for plants by using soil moisture to control an irrigation valve. The prior attempts have either one, or several of the following problems listed below.

(a) Some do not turn completely on and off, such as Gant U.S. Pat. No. 4,696,319 (1987) and Ornstein U.S. Pat. No. 4,182,357 (1980), forcing the sprinkler to dribble, instead of spray, during medium moisture soil conditions. This causes the plants near the sprinkler to drown and the plants just inches away from the sprinkler to die from lack of water. Also, these devices can not be used with drip systems, as there is not enough pressure to force water to the ends of the watering lines.

(b) Some require electricity, such as Lohoff U.S. Pat. No. 4,055,200 (1977), Jones U.S. Pat. No. 5,329,081 (1994), or Coward U.S. Pat. No. 4,256,133 (1981), which would be difficult to install, maintain, and could electrically shock the user.

(c) Some are plant weight based, such as Spelt U.S. Pat. No. 5,848,494 (1998), which is useless for any in ground crop, lawn, or garden.

(d) Some use materials that only respond to very limited ranges of moisture, such as Wild U.S. Pat. No. 4,095,458 (1978), which uses wood, a substance which expands to its maximum length at a 30% moisture content.

(e) Some are not small or simple, such as Lopic et al. U.S. Pat. No. 5,224,795 (1993) and Goldsmith U.S. Pat. No. 4,987,915 (1991), making them expensive to manufacture, and therefor purchase, as compared to the amount of water the device saves.

(f) Some use or suggest materials not suitable for long term operation because the hygrometer device decays and the valve becomes useless, such as the wood or other plant fibers used in Gumbmann, Jr. U.S. Pat. No. 4,648,555 (1987) and Waterson U.S. Pat. No. 3,898,843 (1975).

(g) Some do not respond within a resonable time. Dupont's nylon has a 180 day full cycle time, which would make both Fukami U.S. Pat. No. 4,489,603 (1984) and Watanabe U.S. Pat. No. 4,744,515 (1988) useless for daily changing moisture conditions.

(h) Some are not suitable for use with standard electric timers, as is the case with Nunn U.S. Pat. No. 5,794,848 (1998).

BRIEF SUMMARY OF THE INVENTION

A moisture controlled valve comprising a T pipe, a piston which forms a water tight seal in the pipe, and a piston controlling moisture indicator. The valve permits watering in an insufficiently moist soil condition and prevents watering in sufficiently moist soil conditions.

Object of this Invention

The object of this invention is to describe a valve which assesses the moisture level near the location of a plant and permits watering when the soil is relatively dry and the plant needs water, but will prevent watering when the soil has adequate moisture for the plant. In addition are the following objects and advantages:

(a) to describe a valve that is completely on or off, but never partly on;

(b) to describe a valve that can operate without electricity;

(c) to describe a valve that can work for in ground and potted plants;

(d) to describe a valve that responds to a broad range of moisture levels;

(e) to describe a valve which can be manufactured affordably, as compared to the amount of water the device saves;

(f) to describe a valve which survives for many cycles of moisture level changes;

(g) to describe a valve which responds within a resonable time;

(h) to describe a valve which can be used with presently used irrigation sprinklers and valves.

Further objects and advantages will become apparent from a consideration of the ensuing description and drawings.

Figure 1:
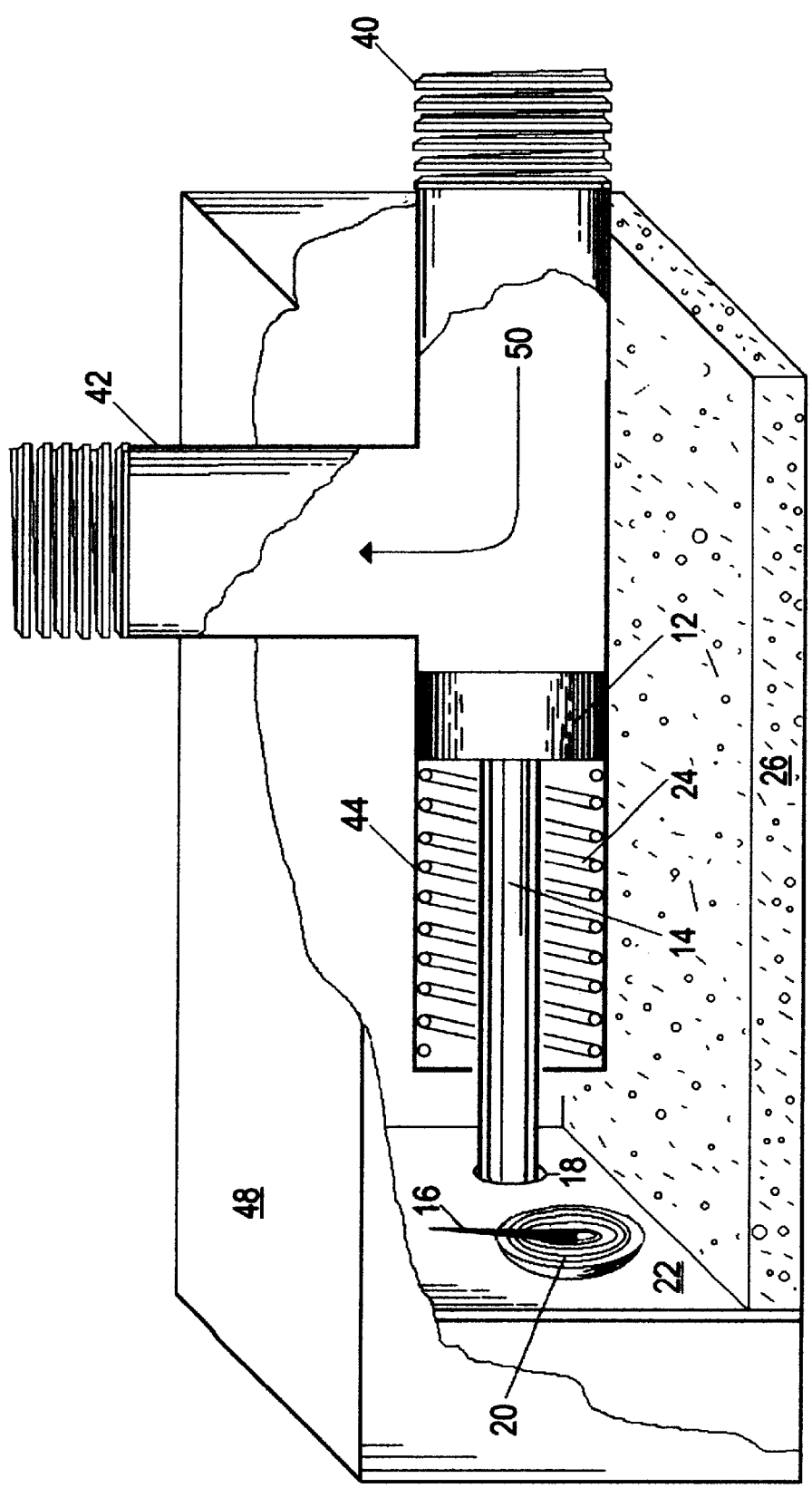
FIG. 1 shows a cross section of the valve in an insufficiently moist soil condition with water going to the sprinkler because the piston has passed by the moisture indicator bar.

REFERENCE NUMERALS IN THE DRAWINGS 12 piston seal
14 piston rod
16 moisture indicator bar
18 piston rod through hole
20 hygrometer coil
22 hygrometer mounting plate
24 piston return spring
26 moisture permeable barrier
40 T pipe water supply side
42 T pipe watering device side
44 T pipe hygrometer side
46 sprinkler
48 container
50 direction of water flow

DETAILED DESCRIPTION OF THE INVENTION

Preferred Embodiment

Figure 3:
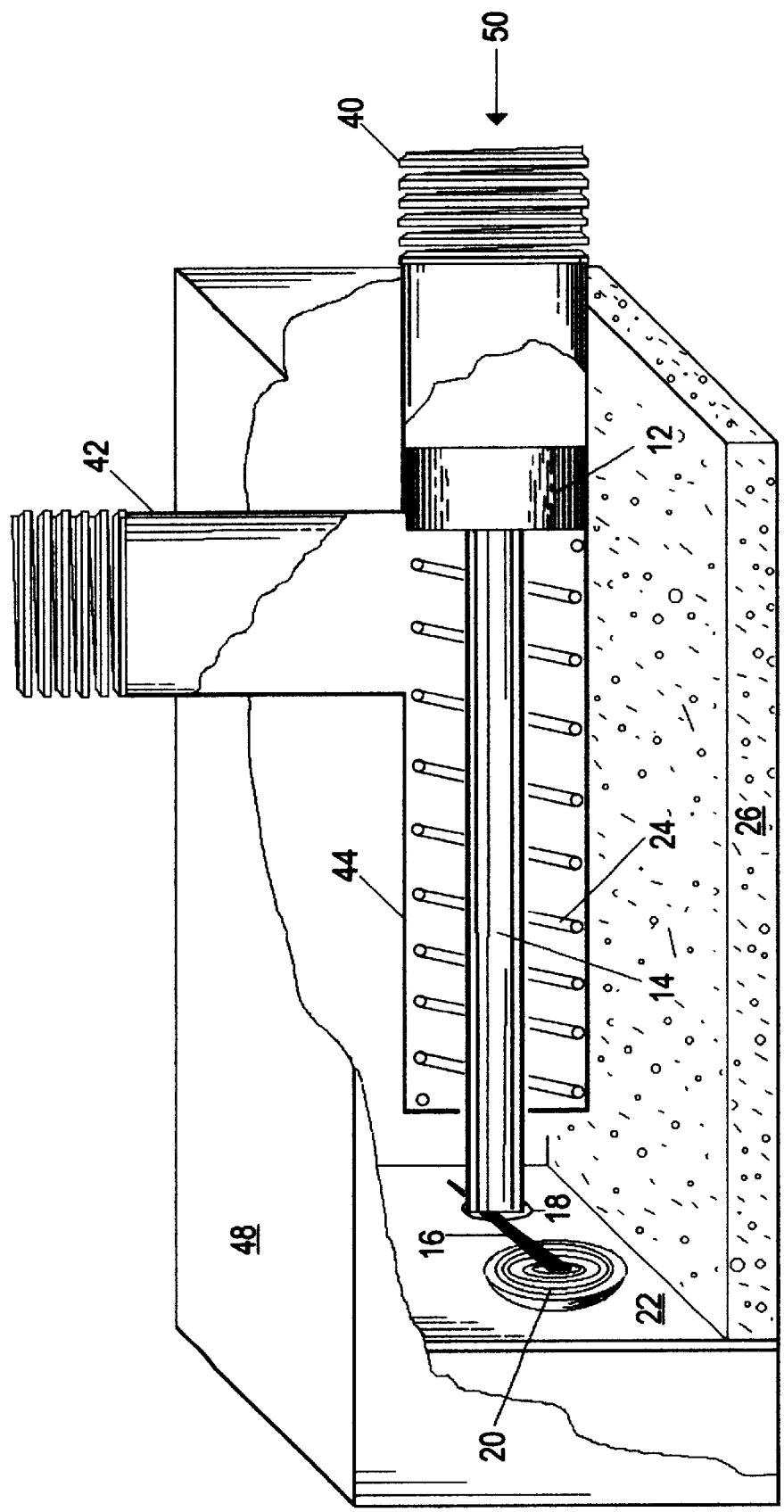
FIG. 3 shows a cross section of the valve in sufficiently moist soil conditions with water not going to the sprinkler because the piston is being stopped by the moisture indicator bar.

A preferred embodiment of the present invention is illustrated in FIG. 1 and FIG. 3. A container 48 supports a T pipe 40, 42, 44, a moisture permeable barrier 26, and a hygrometer mounting plate 22. In the preferred embodiment, the container 48, T pipe 40, 42, 44, and mounting plate 22, will be made of a strong, enduring material such as poly-vinylchloride (PVC—hyphens supplied to facilitate pronunciation) from Dupont Chemical Corporation and injected molded as one unit. However, the container 48, T pipe 40, 42, 44, and mounting plate 22, could be mad of separate units, or of different materials such as brass, steel, ABS plastic, Delrin plastic, vinyl coated iron, other combinations of such materials, or any material that will withstand the mechanical demands of the soil and or of the water supply pressure. The barrier 26, in its preferred form will be baked clay, but could be anything that restricts direct contact with surrounding water and soil particles which may damage the hygrometer coil 20 and permits a relative ambient moisture level to enter into the container 48, such as cement or fine fiber sponge.

Mounted to the plate 22 is a hygrometer coil 20. The coil 20 has attached to it a moisture indicator bar 16, which covers a piston rod through hole 18 in sufficiently moist soil conditions, but uncovers the hole 18 for piston rod 14 to pass in an insufficiently moist soil condition when the water pressure is supplied at supply side 40. In the preferred embodiment the coil 20 and indicator bar 16 are made as one, imported by IFG Instruments, Inc., Barington, IL. However, the coil can be any moisture sensing device which can move an indicator bar 16 to block the motion of rod 14 from going through the hole 18 in a sufficiently moist condition when water pressure is supplied at supply side 40. The indicating bar 16 can be made of any material, such as plastic, metal, or combination of such materials, which can withstand the forces of the rod 14 pressing upon the indicator bar 16 when full water pressure is supplied at supply side 40. In this preferred embodiment, the indicating bar 16 is made of aluminum, in a triangular shape flush with the mounting plate 22, to avoid any torque which may result on the coil 20 from the rod 14 pressing upon the indicator bar 16. Any torque could conceivably damage the attached coil 20, rendering the invention useless. Any shape indicator bar 16 can be used if no torque is applied to the coil 20 when the rod 14 is stopped by the indicator bar 16.

Inside the T pipe sides 40 and 44 are a piston seal 12, a piston rod 14, and a return spring 24. A water flow direction 50 is shown for clarity of understanding from the supply side 40. In the preferred embodiment, the seal 12 is a vinyl cup, with typical dimension of 2.0 mm wall thickness, availible from AERO Rubber Company, Inc., Bridgeview, IL, although any material of any shape which seals to the inside diameter of the pipe such as a rubber block, rubber cup, nylon disk, nylon cup, leather, etc., can perform the same function as the vinyl cup. The length, inside diameter, and outside diameter of the seal 12 are dependent upon the dimensions of the T pipe, 40, 42, 44. The seal 12 is attached to the rod 14, which in this preferred embodiment is a nylon rod. However, any stiff structure may be attached to or incorporated into the seal 12 to form the rod 14, such as steel, iron, vinyl, rubber, PVC, etc., or any stiff material composition. The return spring 24 in this preferred embodiment is placed between the end of the hygrometer side 44 and seal 12. The spring 24 chosen must be weak enough to allow the seal 12 and rod 14 to move when the water pressure applied, but strong enough to return the seal 12 and rod 14 back to its position as shown in FIG. 3. In this preferred embodiment the spring chosen has a wire diameter of 1.27 mm, with its length and coil diameter dependent upon the T pipe 40, 42, 44 and length of travel of the seal 12 and rod 14.

Figure 2:
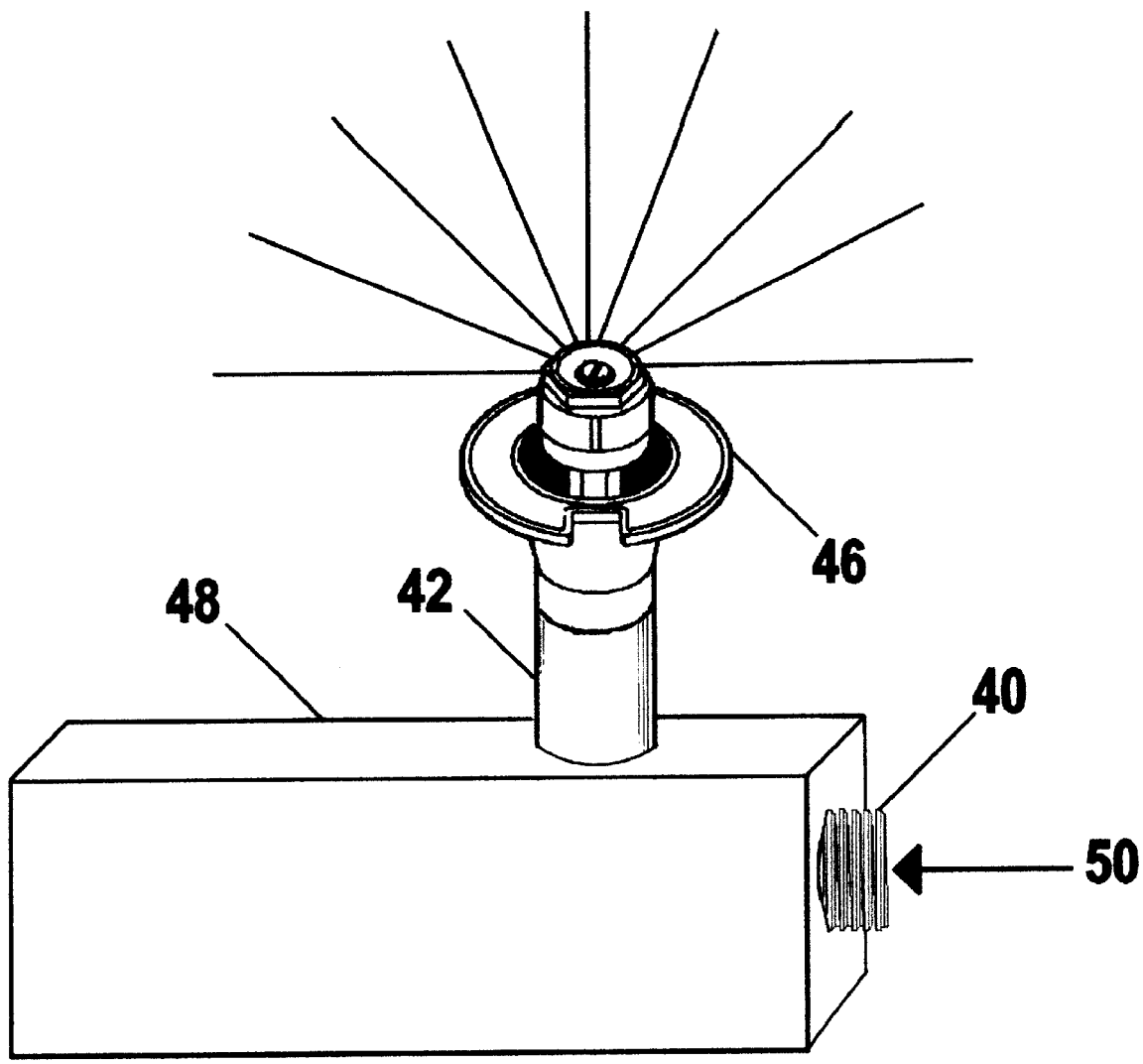
FIG. 2 shows the valve attached to a sprinkler in the insufficiently moist soil condition described in FIG. 1.
Figure 4:
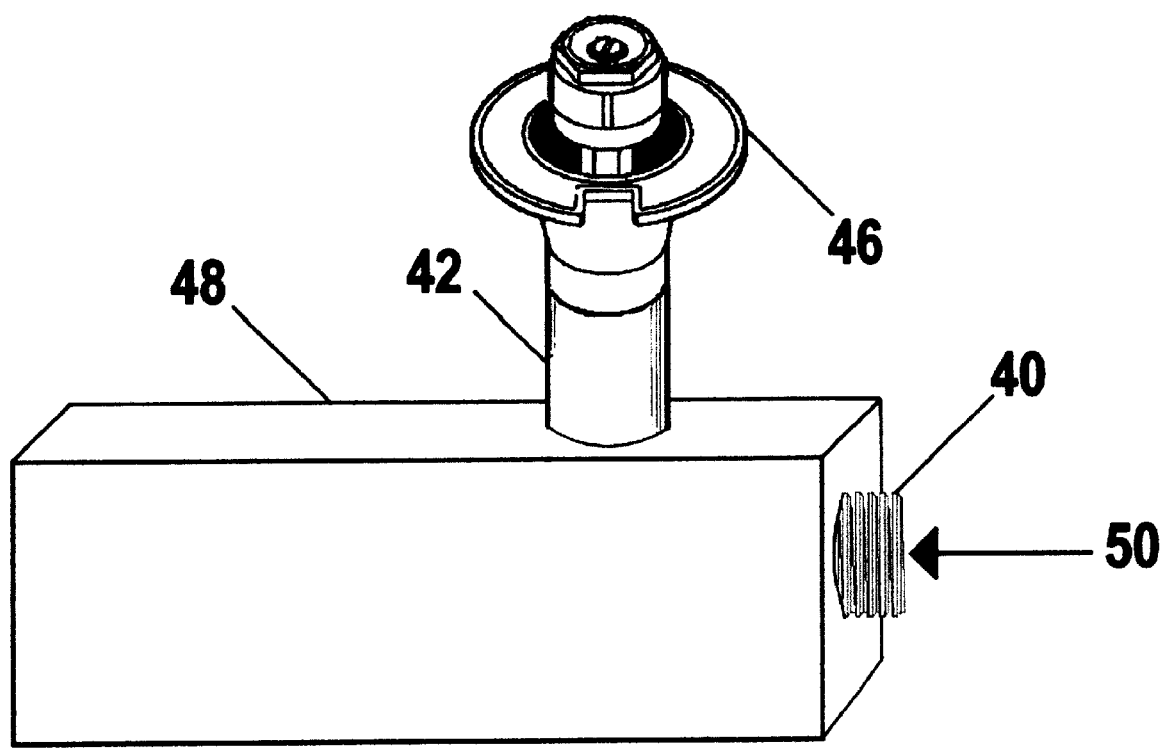
FIG. 4 shows the valve attached to a sprinkler in the sufficiently moist soil condition described in FIG. 3.

A sprinkler 46 is shown in FIG. 2 and FIG. 4 attached to the T pipe watering device side 42. The sprinkler 46 is the presently used nozzle sprayer type made by Lawn Genie or Toro. The sprinkler 46 is shown for clarity of understanding only and is not part of this invention.

Use and Operation of the Invention

The manner of installing the moisture controlled valve is similar to installing sprinkler valves in present use. The user installs the valve in his sprinkler water supply line before one or more sprinklers. The user buries it in his garden, preferably near the plant roots which are being watered. The user operates the water supply to come on and off in the same way and for the same duration as before installation of this moisture controlled valve.

When the soil near the moisture controlled valve is insufficiently moist and water pressure is applied to the supply line, the moisture controlled valve allows water to flow to the sprinkler, watering the insufficiently moist plant roots. When the soil near the moisture controlled valve is sufficiently moist and water pressure is applied to the supply line, the moisture controlled valve does not allow water to flow to the sprinkler, keeping the plants from being over watered.

Operation of the Preferred Embodiment

FIG. 1 shows the insufficiently moist soil condition. The water supply is connected to the T pipe water supply side 40. The sprinkler 46, not shown, is attached to the T pipe watering device side 42. The moisture from the soil has passed through the moisture permeable barrier 26, causing the hygrometer coil 20 to rotate, but there is insufficient moisture for the coil 20 to place the moisture indicator bar 16 in front of the piston rod through hole 18. Therefore, there is nothing blocking the motion of the piston rod 14.

When the water supply is turned on, water enters the T pipe water supply side 40, in the direction of water flow 50. The supplied water pressure forces the piston seal 12 and rod 14 towards the hole 18. The rod 14 moves past the indicator bar 16, through the hole 18, while the seal 12 moves past the device side 42, into the hygrometer side 44, allowing water to flow through the supply side 40, through the device side 42, to the sprinkler 46 (shown in FIG. 2), as shown by water flow 50. Therefore, the plants get watered by the sprinkler 46 (shown in FIG. 2) attached to this moisture controlled valve.

When the water is turned off, the piston return spring 24 presses against the seal 12, which is attached to the rod 14, moving them both back to their initial positions and allowing the indicator bar 16 to move freely. On the supply side 40, there must either be a pressure release valve or an opening in the supply line, such as a sprinkler, to allow the water pressure to decrease enough for the spring to move the seal 12 and rod 14 back to its initial position.

FIG. 2 shows the insufficiently moist soil condition as described in FIG. 1 with the water coming through the moisture controlled valve and out of the sprinkler 46. The sprinkler 46 is attached to the T pipe watering device side 42. The direction of water flow 50, container 48, and T pipe water supply side 40 are shown for clarity of understanding.

FIG. 3 shows the sufficiently moist soil condition. The water supply is connected to the T pipe water supply side 40. The sprinkler 46, not shown, is attached to the T pipe watering device side 42. The moisture from the soil has passed through the moisture permeable barrier 26, causing the hygrometer coil 20 to rotate until the moisture indicator bar 16 is in front of the piston rod through hole 18, blocking the path of motion for the piston rod 14.

When the water is turned on, water enters the supply side 40 in the direction of water flow 50. The supplied water pressure forces the seal 12, and rod 14, towards the hole 18. The indicator bar 16, which is in front of the hole 18, is stopping the motion of the seal 12 and rod 14. The seal 12 cannot advance and so water can not pass beyond the seal 12, nor can water pass through the device side 42 to the sprinkler 46 (shown in FIG. 4). Therefore the sprinkler 46 (shown in FIG. 4) does not turn on and the plants do not get over watered.

FIG. 4 shows the sufficiently moist soil condition as described in FIG. 3 with the water flow 50 being stopped by the water controlled valve, and therefor not coming out of the sprinkler 46. The sprinkler 46 is attached to the T pipe watering device side 42. The direction of water flow 50, container 48, and T pipe water supply side 40 are shown for clarity of understanding.

Advantages

From the description above, a number of advantages of this device becomes evident:

(a) The devices saves money by preventing watering when there is sufficient water in the soil.
(b) Helps prevent draught by saving water.
(c) It prevents damage to plants from over watering.
(d) The device can be used for many types of plants, soil conditions, controllers, and watering devices.
(e) The device allows sprinklers to water at only full pressure, never partly on.
(f) The device is simple to install and operate, simple to maintain, and simple enough to function repeatedly without malfunction.
(g) The device responds quickly enough to accurately read the soil moisture conditions.

Conclusions, Ramifications, and Scope

Accordingly the reader will see that the soil moisture controlled valve of this invention can be used to properly irrigate lawns, gardens, and other plants, conveniently and easily. The valve will help water plants at their optimum water need to produce better vegetation with less waste of water and money.

Alternative Embodiments

Although the description above contains many specificities, these should not be construed as limiting the scope of the invention but merely providing illustrations of some of the presently preferred embodiments of the invention. Alternate embodiments included in this concept can include the following: A block, string, etc., by itself or attached to any moisture responsive material which could create movement may be used in place of a coil; A moisture indicator bar of any hard material such as plastic or metal may be used, in one of several shapes; The piston rod, and or seal, and or return spring may be combined; The valve may be used for any fluid, gaseous or liquid; The piston return spring may be placed inside or outside the T pipe functioning in compression, torsion, or tension; This device can be attached to any device which needs to deliver water dependent on moisture including, but not limited to, sprinklers, patio misters, plant misters, drip watering devices, and flood irrigation devices; Any type of catch or notch arrangement might be used to stop the advance of the piston, such as a small V treadle in the bottom of the T pipe, which when elevated by the hygrometer coil, catches the piston rod and prevents it from passing in sufficient moisture conditions or such as the piston rod could be a flat rod with an arm to catch the moisture indicator bar which prevents the piston rod from passing in sufficient moisture conditions; etc.

Thus the scope of the invention should be determined by the appended claims and their legal equivalents, rather than by the examples given.

We claim:

1. A method for using a variable watering moisture controlled valve device as a moisture controlled valve which does not permit partial fluid flow comprising, a variable flow moisture controlled valve, which encloses a hygrometer, and attached to said hygrometer, a moisture indicator positioned such that said indicator only prevents or permits fluid flow of said variable flow moisture controlled valve, without the possibility for partial fluid flow, whereby said valve can now be used with full pressure watering devices without loss of watering device performance.

2. Claim 1 further comprising, a reciprocating piston rod, and attached to said piston rod, a piston seal, wherein said moisture indicator is positioned less than five degrees on each side of perpendicular to the reciprocation path of said piston rod whereby moisture indicator interrupts the path of said piston rod and makes the variable moisture controlled valve seal completely or flow completely, which turns the variable watering valve into a moisture controlled valve which does not permit partial fluid flow.

3. A moisture controlled valve which does not permit partial fluid flow comprising, a T pipe, a reciprocating piston rod within said T pipe, a piston seal attached to said piston rod, said piston seal positioned such that it covers or uncovers one side hole in said T pipe thus permitting or preventing fluid flow depending on its position within said T pipe, a hygrometer means exposed to air placed such that it is not in the reciprocation path of the piston rod, and fixedly attached to said hygrometer, a moisture indicator bar placed such that it is only in the reciprocation path of said piston rod when said hygrometer measures a sufficiently moist condition, a moisture permeable barrier means which restricts solid particles from damaging said hygrometer means, whereby the moisture from the soil passes through said moisture permeable membrane, where the moisture is sensed by said hygrometer means, which moves said moisture indicator bar into or out of the reciprocation path of said piston rod depending on the moisture level, thereby controlling the fluid flow in said valve while not permitting partial fluid flow.

* * * * *